Sept. 14, 1965
W. P. EWALD ETAL
3,205,766
CONTROL APPARATUS
Filed June 18, 1962
2 Sheets-Sheet 1
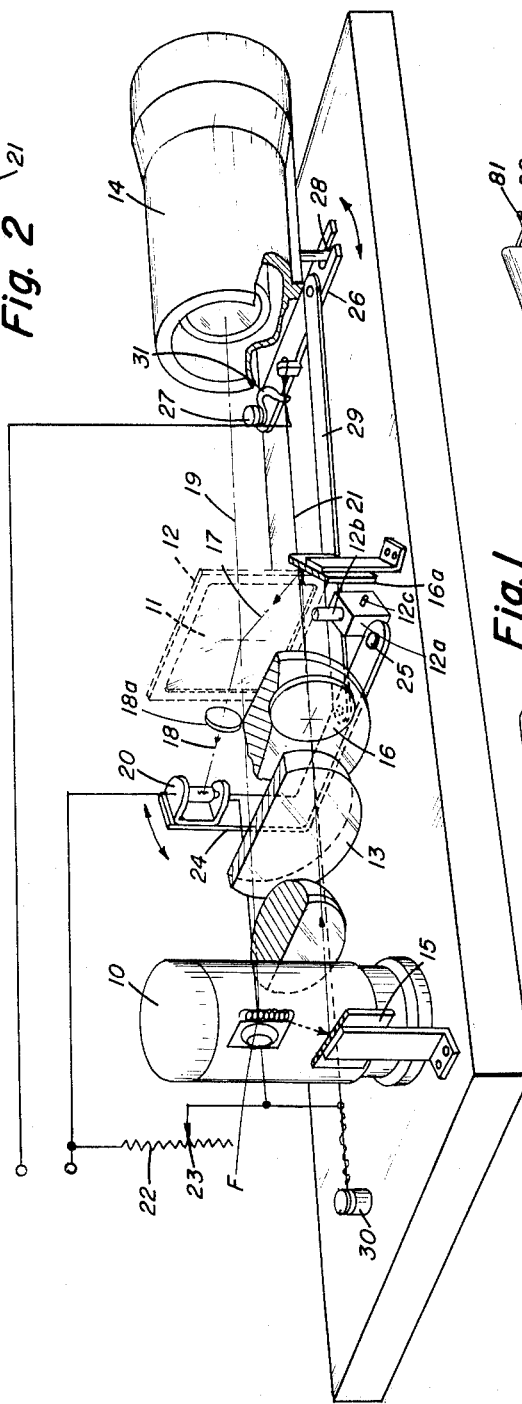
WILLIAM P. EWALD
SAMUEL S. MERZ
INVENTORS
BY R. Frank Smith
Joe Allen Jones
ATTORNEYS

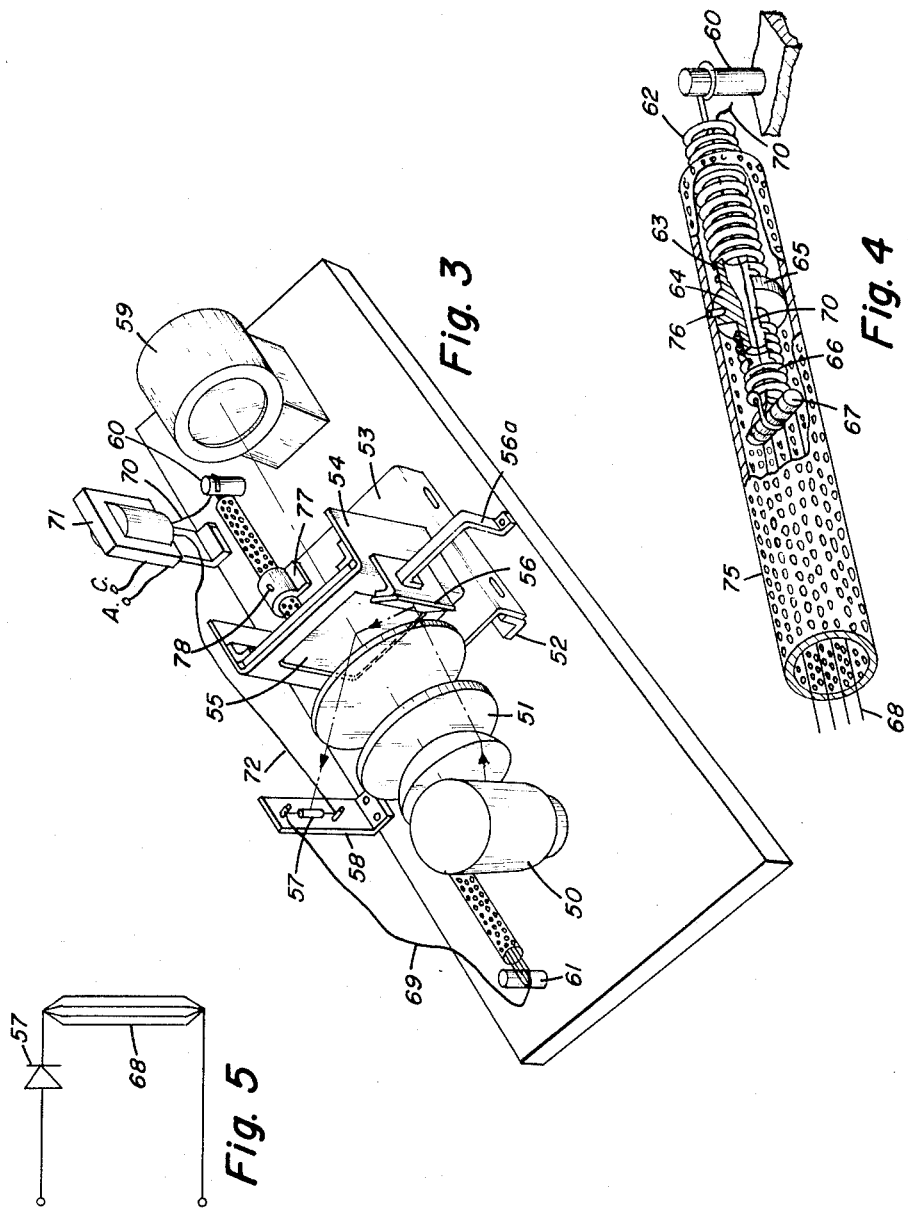

United States Patent Office 3,205,766
Patented Sept. 14, 1965

3,205,766
CONTROL APPARATUS
William P. Ewald and Samuel S. Merz, Rochester, N.Y., assignors to Eastman Kodak Company, Rochester, N.Y., a corporation of New Jersey
Filed June 18, 1962, Ser. No. 203,186
19 Claims. (Cl. 88—24)

This invention relates to photographic projection apparatus, and more particularly to a method and means to automatically correct for focus change during projection. More particularly, the invention is directed to correcting focus change caused by heat distortion or "popping" of film during projection. This occurs, for example, when 35 mm. slides in 2 x 2 inch cardboard mounts are projected. The invention is also applicable to other types of projection apparatus such as motion picture projectors.

It is known to detect changes in film position during projection by reflecting a light beam from the film surface at near grazing incidence. Shift of the film surface causes a deflection of the reflected light beam which is sensed by light-sensitive cells. It is also known to use the signal from the cells to shift the inner focal plane of the projection lens to compensate for the shift in film plane.

We have found that a much more satisfactory compensation is achieved by repositioning the slide or the projection lens, and further, that this may be accomplished by use of a single light-sensitive cell. We have found also that there is particular advantage in using the thermal expansion and contraction of an element that is preferably an electrical conductor connected to said cell, but which may be an element heated by a conductor so connected.

We have found also that a rectifier type cell that provides a flow of current in the cell upon receiving a predetermined level of illumination and is substantially nonconducting when the light falls below this level, has particular value in projector focusing apparatus as described herein. It permits use of a selected illumination level in the light beam reflected from the face of a film to cause a continuous hunting movement of the cell and/or other parts movable under the control of the cell.

Accordingly, it is an object of the invention to provide apparatus to automatically correct for focus changes during film projection caused by heat distortion of the film, wherein a highly efficient and quick-acting adjustment of the position of the slide or projection lens is accomplished in an economical manner.

A further object of the invention is to accomplish such focus correction by means having a large coefficient of thermal expansion and responsive to the heating and cooling of a conductor through which electric current passes, current flow being controlled by a light-sensitive cell, resulting in expansion and contraction of such means.

Another object of the invention is to accomplish such focus correction by use of a single light cell, whereas two were needed in prior art designs.

A further object of the invention is to provide a control arrangement including a light-sensitive rectifier cell responsive to a predetermined level of illumination to provide a continuous hunting movement.

The above and other objects of the invention will be apparent from the following specification, taken in conjunction with the attached drawing, in which:

FIG. 1 shows a schematic perspective view, partly in section and, showing one embodiment of the invention.

FIG. 2 is a circuit diagram of the electrical portion of the embodiment shown in FIG. 1.

FIG. 3 is a schematic perspective view showing a preferred embodiment of the invention.

FIG. 4 is a detail perspective view with parts broken away for purposes of clarity, showing the right-hand end portion of the perforated tube shown in FIG. 3.

FIG. 5 is a circuit diagram for the embodiment shown in FIG. 3.

FIG. 6 is a detail perspective view of one form of slide holder with a slide sensing switch mounted thereon, and FIG. 7 is a detail perspective view of a projector shutter operating a switch.

Referring now to FIG. 1, there is shown a light source 10 having a filament F arranged to illuminate a film 11 of a photographic "slide" in a suitable film holder 12 through a condenser lens system 13. A switch 12a connected as shown in FIG. 2 is positioned to be operated through a feeler pin 12b by the slide. The film is projected through a projection lens 14 onto a suitable projection screen, not shown. A reflector 15 is positioned to reflect light from the source 10 through a lens 16 onto a second reflector 16a which directs the light to the surface of film 11 at a grazing angle, the incident light directed to the film being indicated by arrow 17 while the reflected light, indicated by arrow 18, forms a shadow image of filament F by means of a relay or objective lens 18a, as shown in FIG. 1. Positioned on the opposite side of the optical axis 19 from reflector 16a is a light-sensitive cell 20 which is preferably a light-sensitive silicon controlled rectifier, which is conductive at and above a predetermined level of illumination and nonconductive below that level. This cell may, for instance, be of the type made by General Electric Company under the designation ZJ235.

Cell 20 is connected in an electrical circuit as shown in FIG. 2, which includes an A.C. source as indicated, switch 12b and a wire or other conductor 21 having a large coefficient of thermal expansion and high electrical resistivity such as material known as Nichrome. The cell 20 is in series with wire 21, and a bias adjustment 22 in the circuit comprises a manually-controlled rheostat 23 connected in shunt with the cell and in series with the conductor 21 to apply a bias current to the conductor for a purpose that will be explained in greater detail below. Switch 12a provides a convenient means to connect the bias to conductor 21 and disconnect cell 20 when no slide is present in the holder 12, and to connect cell 20 to the conductor and disconnect the bias when a slide is present in the film holder. A manual override button for the switch is shown at 12c.

Cell 20 is carried by an arm 24 that is pivoted to datum at 25. Another arm 26 is pivoted to datum at 27 and is arranged, as by means of a pin and slot connection 28, to move the projection lens 14 in an axial direction as the arm 26 is moved. Arms 24 and 26 are pivotally connected together by a link 29. Wire 21 is connected at one end to datum at 30 and at the other end to arm 26. A spring 31 is also connected to arm 26 in such manner as to bias arm 26 in a direction opposite to the pull exerted upon arm 26 as wire 21 shortens.

Conventional means for initial focusing of the projection lens 14 have not been shown, but they may be interposed between arm 26 and lens 14 or may be operated by arm 26 as by a connection from arm 26 to operate the rack and pinion or other mechanism conventionally used for manual focusing of a projection lens. In one construction, not shown, arm 26 and the conventional focus knob are both connected to operate the pinion gear of the conventional rack and pinion device for focusing the lens, a slip clutch being conveniently included in such manner that movement of the manual focusing device will not cause internal movement within the automatic focusing apparatus.

In operation of the embodiment shown in FIG. 1, a line source of light is provided by a side or near side view of the projection lamp filament which is imaged by reflectors 15 and 16a, lens 16 and the film surface which the light strikes at a grazing angle. The image of the filament is broadened laterally when reflected from the film's surface and is sensed by cell 20. Axial distortion of the film upon being heated during projection causes the displacement of the light beam and accordingly a change in the illumination of the cell. This change in illumination of the cell at a certain level of illumination causes an abrupt change in its conductivity from conducting to nonconducting (or vice versa) and therefore a change in the flow of current through wire 21. Thus, when cell 20 is conducting, it permits electrical current to flow through wire 21, resulting in heating and increase in the length of the wire as a result of thermal expansion. Such expansion permits spring 31 to move arm 26 and thereby move projection lens 14 to change the focus. When arm 26 is so moved, link 29 causes a corresponding movement of arm 24 and cell 20 in a direction to move the cell to the dark portion of the image in the light reflected from the surface of the film.

Movement of the cell into the dark portion of the image causes its conductance to cease, with a resulting decrease in the current flowing through wire 21. This permits wire 21 to cool and in doing so, it shortens and overcomes the bias of spring 31, resulting in movement of arm 26 in a direction opposite from the movement caused by spring 31. This movement of arm 26 is transmitted through link 29 to arm 24 to move cell 20 back toward the bright portion of the image. When this occurs, heating of the wire 21 results and the cycle is repeated. The parts are arranged so that an in-focus projected picture results at the null point, that is, at the point when the net on-time and net off-time of the light actuated cell are equal. Such net on-time and net off-time correspond, of course, to net heating and cooling times in regard to wire 21.

Axial distortion of the film upon "popping" causes displacement of the light beam 18 reflected from the film surface so that the system balance is upset. The cell thereupon will conduct continuously or not at all depending upon the direction of film distortion until a new equilibrium point is reached. The sensitivity of the system will be related to the manner in which link 29 and arms 24 and 26 are arranged as regards the degree of movement of the cell in relation to focusing movement of the lens suitably in a ratio of about 3:1. The cell searches for a dark position exactly at the shadow line and in practice is continually probing the shadow line, sensing light and immediately retreating into dark. This position corresponds to the correct focus position or slide after the rough focus position has been manually established.

It will be understod that the hunting movement of the cell is very slight and, though transmitted through the linkage to the projection lens or slide holder, does not result in movement of the lens or film sufficiently to cause appreciable change of focus in the screen during the above-mentioned continuous sensing or hunting movement. However, a significant shift in the position of the film surface causes such a lateral reflection of the filament image shadow line as to cause the cell to be moved to a new position of equilibrium at the border of the shadow line in the dark portion. This movement takes place very quickly, for example, in a fraction of a second, when compensating for a "popping" effect that occurs during projection of 35 mm. slides. After refocusing occurs, the cell continues its hunting movement in the new position.

The rough focus position for any particular projector-to-screen distance may be adjusted by a suitable adjustment (not shown) in the length of link 29. The bias current controlled by the manually-operated rheostat serves, when desired, to establish a selected operating range for the apparatus; for example, when no film is in the film holder the cell will receive no light, and without a bias current the wire 19 will cool until it reaches ambient temperature and causes a substantial change of focus. Then when a slide is introduced, there could be an unduly large change in focus as the reflective path to the cell is re-established. However, use of a bias current maintains the wire at some preselected optimum temperature even though there is a prolonged time interval during which there is no slide in the projector and therefore no image of filament F for the cell to probe. Then, after such interval, if a slide is placed in the projector the lens will have remained at the optimum focus position by virtue of the bias current. Introduction of the slide disconnects the bias and the cell is connected for automatic operation as already explained.

Reference has been made above to an override button 12c for switch 12a. This override device permits manual operation of the switch to connect the bias circuit to the hot wire and disconnect the cell even though a film is in holder 12. Such operation provides several advantages. For one, it permits focusing on a particular area of the film by operation of the bias adjustment 23, for example, where the automatic device is set to focus on the center of the film or to provide an average focus over the entire area of a film that is curved in cross section. Thus operation of the override would permit focus on a corner or other area of the film. Another advantage is that by overriding switch 12a, the operator may thus connect the bias and disconnect the cell in order to adjust the bias to the optimum adjustment so that a minimum of focusing movement takes place.

We have referred in the above disclosure to a single wire 21. Obviously, other forms of conductors in bar, tube or other form providing the proper resistivity and thermal expansion and contraction characteristics may be used, for example, wire 21 may comprise a plurality of wires, or if desired, a single wire could operate arm 26 by means of a pulley arrangement as the wire expands and contracts. It is also within the inventive concept to use the hot wire to heat another element which has a large coefficient of thermal expansion, the expansion and contraction of which acts in place of the hot wire to accomplish refocusing movement of the parts.

Referring now to FIGS. 3–5, there is shown a projection lamp 50, a condenser lens system 51, a fixed guideway 52 and a carriage 53 movably mounted on the guideway for movement along the optical axis. Carriage 53 carries a slide holder 54 in which is shown a photographic film slide 55. A reflector 56 is fixedly mounted on a bracket 56a so as to reflect an edge portion of the light passing through the condenser lens system onto the film 55 at a grazing angle from whence it is reflected, preferably through an objective lens (not shown) similar to lens 18a of FIG. 1, to a light-sensitive rectifier cell 57 which is of the type described above. The cell is mounted on a suitable bracket 58. The projection lens is shown at 59 and in practice would include any suitable focusing adjustment device, which is not shown, to provide for variations in the lens to projection screen distance.

Mounted to one side of the carriage are a pair of datum posts 60 and 61, post 60 being shown in the detail view of FIG. 4. Attached to post 60 is a spring 62 which constitutes the return spring that maintains the hot wire in taut condition and corresponds to spring 31 of FIG. 1. The other end of spring 62 is attached at 63 to a collar 64 having an axial bore 65 extending therethrough. Another and much heavier spring 66 is attached to the opposite side of collar 64 and to a cross-bar or tension member 67. Spring 66 is substantially unyielding and provides in effect, a solid connection between cross-bar 67 and collar 64.

Cross-bar 67 serves for the attachment of one end of hot wires 68, four such wires being shown in this embodiment, although the number of wires is not critical. These wires are attached at their other end to datum post 61. As shown, all of the wires 68 are brought together electrically at 61 and at the cross-bar 67. From the attachment at 61, a connection is made from wires 68 to one terminal of cell 57 by wire 69. At cross-bar 67, the wires 68 are attached to an insulated wire 70 which passes through spring 66, through bore 65 and through spring 62. Wire 70 is connected to a suitable voltage source 71, the voltage source being attached to the lower terminal of cell 57 by means of wire 72. The voltage source is shown here as a transformer but in practice, may conveniently constitute a winding of the blower motor conventionally used on projectors. A relatively low voltage of 10 volts or less is furnished by source 71. A suitable amplifier, not shown, may be used to increase the current flowing from the cell to the hot wire. Such amplifier may utilize suitable tubes or transistors.

A shielding member in the form of perforated tube 75 surrounds the hot wire and spring mechanism and is fixed to collar 64 by suitable means such as one or more pins 76. Tube is suitably attached to carriage 63 as shown at 77 in which a bracket attached to the carriage is also attached to the tube as by a set screw 78 or other suitable means.

Tube 75 is conveniently of aluminum for lightness and is perforated with fine openings so as not to trap the heat of wires 68 within its interior, but at the same time, to prevent the temperature of wires 68 from being influenced by unexpected drafts.

In operation, the wires 68 will heat when cell 57 is in a conducting condition and cool when it is nonconducting, this condition being governed as explained in FIG. 1 by the illumination reaching the cell. As wires 68 become heated and expand, spring 62 pulls collar 64 and thereby tube 75 to the right in FIG. 3. This pull is imparted directly to cross-bar 67 through spring 66. This heavy spring provides, as explained above, a substantially unyielding connection under normal operation and is included in the device only to prevent rupture of wires 68 in the event that some inexperienced person grasps tube 75 and moves it in a rough manner.

As tube 75 is thus moved to the right, it transmits this movement through connection 77 to carriage 53 to reposition the film 55.

Upon cooling and the resulting contraction of wires 68, the cross-bar 67 is moved to the left, moving with it collar 64 and tube 75, such movement stretching spring 62. This movement is also imparted to the carriage 53 through tube 75, and the film is thus moved to the left in FIG. 3.

While not shown in FIG. 3, a bias adjustment device as shown at 23 in FIG. 1 can be used with the embodiment of FIG. 3.

FIG. 6 shows in detail a portion of a film gate or holder with a switch for sensing the presence of a slide in the film holder. The film holder is of the type to which a slide is fed by downward movement into the space between a first plate 80 and a second plate or pressure pad 81. Plate 80 has vertical flanges 82 that form a guideway for movement of plate 81 toward and away from plate 80 by suitable mechanism, not shown. The two plates have aligned central openings indicated at 83 which are also aligned with the optical axis of the projector. The two plates would be suitably mounted on a carriage such as shown at 53 in FIG. 3 when used in apparatus for refocusing by movement of the slide as in FIG. 3.

Plates 80 and 81 have aligned holes therein as indicated perspectively at 84 and 85, these holes being positioned such that the cardboard mount for a photographic slide, when positioned in the slide holder, covers these holes.

A switch 86, corresponding to switch 12a of FIG. 1, is suitably mounted for cooperation with the slide holder, for example, as shown in FIG. 6, by mounting on a lower flange 87 of pressure pad 81. The switch has a movable center post 88 connected to the hot wire and normally in a leftward position as viewed in FIG. 6, with contact 89 of the center post in engagement with a contact 90 that is connected to the electrical bias device 23. When post 88 is moved to the right in FIG. 6, contact 89 moves away from contact 90 and into engagement with contact 91 which is connected to the cell 20 or 57.

The feeler pin 92 carried by the upper end of post 88 is positioned for movement into opening 85 and when no slide is positioned in the holder, the pin may extend into opening 84. In this position, contacts 89 and 90 are in engagement and the bias circuit is connected to the hot wire, the cell being disconnected. When a slide is present in the holder, movement of pin 85 into opening 84 is blocked as the pressure pad moves toward plate 80, resulting in movement of contacts 89 and 91 into engagement with each other, thus breaking the connection of the bias circuit to the hot wire and connecting the cell to the hot wire.

As shown in FIG. 7, a similar switch arrangement may be positioned for operation by a movable shutter when such is used in a projector. In this type of arrangement movement of a shutter blade 95 to closed position (cutting off the projection beam) in which the blade is shown in FIG. 7, causes switch 96 to connect the bias to the hot wire. Opening of the shutter blade would cause connection of the cell to the hot wire and disconnection of the bias. The open position of the blade is shown in broken lines. In FIG. 7 the optical axis is indicated at 97 and a film mount or slide is shown at 98. A manual override control is indicated at 99 to permit manual switching to connect the bias to the hot wire and disconnect the cell, when the shutter is open. As explained above, this permits adjustment of a bias adjustment control when used with this construction.

It will be understood of course that various combinations of the features shown or described in connection with one or more figures of the drawings may be used, for example, the cell may be made movable in the construction of FIGS. 3–5, the shielding tube 75 may be used in constructions similar to FIG. 1, etc.

The invention has been described in detail with particular reference to preferred embodiments thereof, but it will be understood that variations and modifications can be effected within the spirit and scope of the invention as described hereinabove and as defined in the appended claims.

We claim:

1. In photographic film projection apparatus providing automatic maintenance of focus and including a projection lens and a holder for the film being projected, and wherein movement of a bright image reflected from the surface of the film being projected indicates a change in film position, the improvement comprising a light-sensitive cell positioned to receive said reflected image and having an electrical conductance depending upon the illumination reaching the cell, an electrical circuit including said cell as well as a voltage source and an electrical conductor of relatively high resistivity, and means responsive to heating and cooling of said conductor by virtue of changes in the current flowing through it for producing relative movement between said projection lens and said film holder for substantially correcting any defocusing caused by said change in said film position.

2. Apparatus according to claim 1 wherein said cell is a light-sensitive silicon controlled rectifier.

3. Apparatus according to claim 1 wherein said means comprises a mechanical linkage including means for moving the cell.

4. Apparatus according to claim 3 wherein said mechanical linkage includes means for moving the cell at a different rate from said relative movement.

5. Apparatus according to claim 4, and biasing means acting in opposition to movement of said linkage caused by cooling of said conductor.

6. Apparatus according to claim 1, said circuit including means for applying a variable bias current to said conductor.

7. Apparatus according to claim 1 wherein said cell is stationary and said film holder is mounted for movement along the optical axis of the projector, and means for imparting refocusing movement to the film holder upon heating and cooling of the conductor.

8. Apparatus according to claim 1 wherein conductor has a large coefficient of thermal expansion said last named means includes a member at least partially enclosing said conductor, and means mechanically connecting said conductor to said member to convert changes in length of said conductor upon heating and cooling thereof, into movement of said member.

9. Apparatus according to claim 8 wherein said member comprises a perforated tube.

10. Apparatus according to claim 8 wherein said member comprises a perforated tube, said film holder being mounted for movement along the optical axis, and means for imparting such movement to the film holder from said tube.

11. Apparatus according to claim 1 wherein said conductor has a large coefficient of thermal expansion, said last named means including a perforated tube at least partially enclosing said conductor, one end of the conductor being held against movement and the other end mechanically attached to said tube, and resilient means acting on said tube to resist movement thereof upon contraction of the conductor.

12. In photographic film projection apparatus providing automatic maintenance of focus, and having a light source and a film holder, the improvement comprising a light-sensitive cell the electrical conductance of which depends on the illumination of the cell, means for directing light at a grazing angle onto the surface of film in said holder for reflection to said cell, an electrical circuit including said cell, a voltage source and a conductor of high resistivity and large coefficient of thermal expansion, said conductor being anchored against movement at one end, a tension element to which the other end of the conductor is attached, a resilient element anchored to datum, a collar to which said resilient element is attached and which is urged by said resilient element toward datum and away from said one end of the conductor, a connection between said collar and said tension element to transmit the bias of said resilient element from said collar to said tension element to maintain the conductor in taut condition by moving the collar and tension element upon thermal expansion of the conductor when a flow of electrical current therein heats the conductor, and by yielding to movement of the collar and tension element upon shortening of the conductor, a relatively rigid shielding element at least partially enclosing said conductor and attached to said collar for movement with the collar, and means for transmitting movement of said shielding element to said film holder.

13. Apparatus according to claim 12 wherein said connection comprises a relatively heavy coil spring arranged to yield only in response to unusual tensions which would otherwise be likely to rupture said conductor.

14. Apparatus according to claim 1, said circuit including circuit means for applying a bias current to said conductor, and switch means positioned to detect the presence of a film in the film holder and to connect the bias circuit means to said conductor and disconnect said cell when film is not present in the film holder, and to connect the cell to the conductor and disconnect the bias circuit means when film is present in the film holder.

15. Apparatus according to claim 14, means for adjusting the bias current, and means for overriding said switch means so as to connect said bias means and disconnect said cell, even though a film is present in the film holder.

16. Apparatus according to claim 1, shutter means for blocking projection light when in a closed position, and switch means operable by said shutter means to connect the bias circuit means to said conductor and disconnect said cell when said shutter means is in said closed position, and to connect the cell to the conductor and disconnect the bias circuit means when the shutter means is open.

17. Apparatus according to claim 16, means for adjusting the bias current, and means for overriding said switch means so as to connect said bias means and disconnect said cell, even though the shutter means is open.

18. Apparatus according to claim 1 and means for amplifying current flowing from said cell to said conductor.

19. A follow-up control system comprising a light-sensitive rectifier cell that conducts electrical current when subjected to a predetermined level of illumination and is substantially nonconductive at lower levels; means for directing a bright image into proximity with said cell; electrical circuit means in which the flow of current is controlled by said cell, said electrical circuit means including said cell, a voltage source and an electrical conductor of high resistivity and large coefficient of thermal expansion; and means under the control of said electrical circuit means for varying the positions of said image and said cell in relation to each other to maintain a preselected relation, said conductor being connected to control said position varying means by changes in the temperature of said conductor as said cell is rendered conductive and nonconductive, respectively.

References Cited by the Examiner

UNITED STATES PATENTS

| | | | |
|---|---|---|---|
| 2,697,962 | 12/54 | Burns | 250—234 X |
| 2,782,682 | 2/57 | Browning et al. | 88—40 |
| 2,857,808 | 10/58 | Hastings | 88—40 |
| 2,947,215 | 8/60 | Mitchell | 88—24 X |
| 2,949,830 | 8/60 | Nawijn | 88—57 |
| 2,964,903 | 12/60 | Porter et al. | |
| 3,037,423 | 6/62 | Shurcliff | 88—26 |

FOREIGN PATENTS 823,404 11/59 Great Britain.

NORTON ANSHER, *Primary Examiner.*

EMIL G. ANDERSON, *Examiner.*